(12) United States Patent
Seong et al.

(10) Patent No.: US 10,409,419 B2
(45) Date of Patent: Sep. 10, 2019

(54) TOUCH WINDOW

(71) Applicant: LG INNOTEK CO., LTD., Seoul (KR)

(72) Inventors: Dong Mug Seong, Seoul (KR); Seung Jin Kim, Seoul (KR); Jong Sun Kim, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 0 days.

(21) Appl. No.: 16/255,553

(22) Filed: Jan. 23, 2019

(65) Prior Publication Data

US 2019/0155445 A1    May 23, 2019

Related U.S. Application Data

(63) Continuation of application No. 15/124,930, filed as application No. PCT/KR2015/001797 on Feb. 25, 2015, now Pat. No. 10,234,980.

(30) Foreign Application Priority Data

Mar. 11, 2014 (KR) .................. 10-2014-0028138
Apr. 30, 2014 (KR) .................. 10-2014-0052937

(51) Int. Cl.
*G06F 3/041* (2006.01)
*G06F 3/044* (2006.01)

(52) U.S. Cl.
CPC ............ *G06F 3/0416* (2013.01); *G06F 3/044* (2013.01); *G06F 3/0412* (2013.01);
(Continued)

(58) Field of Classification Search
None
See application file for complete search history.

(56) References Cited

U.S. PATENT DOCUMENTS 6,690,391 B1   2/2004   Kim et al.
2011/0141051 A1*   6/2011   Ryu .................. G06F 3/044
                                           345/173

(Continued)

FOREIGN PATENT DOCUMENTS

CN          202600653 U    12/2012
KR   10-2001-0003503 A    1/2001
(Continued)

*Primary Examiner* — Kenneth B Lee, Jr.
(74) *Attorney, Agent, or Firm* — Birch, Stewart, Kolasch & Birch, LLP

(57) ABSTRACT

A touch window includes an electrode member; a cover substrate comprising an active area and an inactive area on the electrode member a sensing electrode on the electrode member; and a wire on the electrode member and electrically connected to the sensing electrode, further the sensing electrode includes a first sensing electrode extending in first direction and a second sensing electrode extending in second direction different from the first direction, also the wire includes a first wire connected to the first sensing electrode and a second wire connected to the second sensing electrode, and wherein the first sensing electrode, the second sensing electrode, the first wire, and the second wire are disposed on a same surface of the electrode member a connection part connected to one end of the wire and connected to a circuit board. In addition, the wire comprises a plurality of wires, and the wire has a line width that varies according to a distance from the connection part.

20 Claims, 20 Drawing Sheets

(52) U.S. Cl.
CPC ............ *G06F 2203/04102* (2013.01); *G06F 2203/04103* (2013.01); *G06F 2203/04112* (2013.01)

(56) References Cited

U.S. PATENT DOCUMENTS

| | | | |
|---|---|---|---|
| 2012/0056664 A1* | 3/2012 | Nam ........................ | G06F 3/044 327/517 |
| 2012/0313888 A1* | 12/2012 | Lee ......................... | G06F 3/044 345/174 |
| 2013/0181942 A1* | 7/2013 | Bulea ...................... | G06F 3/044 345/174 |
| 2014/0078416 A1* | 3/2014 | Kim ........................ | G06F 3/044 349/12 |

FOREIGN PATENT DOCUMENTS

| | | |
|---|---|---|
| KR | 10-2009-0011244 A | 2/2009 |
| KR | 10-2012-0018392 A | 3/2012 |
| KR | 10-2012-0110887 A | 10/2012 |
| KR | 10-2013-0022946 A | 3/2013 |
| KR | 10-2013-0124802 A | 11/2013 |

* cited by examiner

TOUCH WINDOW

CROSS REFERENCE TO RELATED APPLICATIONS

This application is a Continuation of U.S. patent application Ser. No. 15/124,930, filed on Sep. 9, 2016, which is the National Phase of PCT International Application No. PCT/KR2015/001797, filed on Feb. 25, 2015, which claims priority under 35 U.S.C. 119(a) to Patent Application Nos. KR 10-2014-0028138, filed in Republic of Korea on Mar. 11, 2014, and KR 10-2014-0052937, filed in Republic of Korea on Apr. 30, 2014, all of which are hereby expressly incorporated by reference into the present application.

BACKGROUND OF THE INVENTION

Field of the Invention

The embodiment relates to a touch window.

Discussion of the Related Art

Recently, a touch panel, which performs an input function through the touch of an image displayed on a display device by an input device, such as a stylus pen or a finger, has been applied to various electronic appliances.

The touch panel may be mainly classified into a resistive touch panel and a capacitive touch panel. In the resistive touch panel, glass is shorted with an electrode due to the pressure of the input device so that a touch point is detected. In the capacitive touch panel, the variation in capacitance between electrodes is detected when a finger of the user is touched on the capacitive touch panel, so that the touch point is detected.

In the resistive type touch panel, the repeated use thereof may degrade the performance thereof, and cause scratches. Accordingly, the interest on the capacitive type touch panel representing superior endurance and having a long lifespan is increased.

According to the related art, a touch window is manufactured through a scheme of bonding a printed circuit board such as a flexible printed circuit board (FPCB) on which a driving chip for driving the touch window according to a variation of capacitance is mounted, after a deco layer is formed and a sensing electrode and a wire electrode are formed on a cover substrate or a substrate.

The touch window is defined as an active area through which a touch instruction is input and an unactive area formed around the active area. The sensing electrode formed on the active area is formed of a transparent conductive material, and the wire electrode formed on the unactive area is formed of a nontransparent metallic material.

The wire electrode electrically connects the flexible printed circuit board to the sensing electrode. The length of the wire electrode is varied according to a position of the sensing electrode. There is a difference between resistance values of the wire electrodes due to a difference between the lengths of the wire electrodes. A signal exchanged between the flexible printed circuit board and the wire electrode is distorted due to the difference between the resistance values of the wire electrodes.

SUMMARY OF THE INVENTION

The embodiment provides a touch window of which touch accuracy is improved, and a display including the same.

According to one embodiment, there is provided a touch window which includes a substrate; a sensing electrode on the substrate; a wire electrically connecting the sensing electrode; and a connection part connected to one end of the wire and connected to a circuit board, wherein an amount of charges in a sectional area of the wire is varied depending on a position in the wire.

According to another embodiment, there is a touch device which includes a touch window; and a driving part on the touch window, wherein the touch window includes a substrate; a sensing electrode on the substrate; a wire electrically connecting the sensing electrode; and a connection part connected to one end of the wire and connected to a circuit board, wherein an amount of charges in a sectional area of the wire is varied depending on a position in the wire.

According to the embodiment, since the amount of charge per a unit area is variously set in the wire, the touching operations on the long distance sensing electrode and the short distance sensing electrode may be stably performed. That is, by minimizing the signal difference between the long distance sensing electrode and the short distance sensing electrode, the differences (delta capacitance) between capacitance values before and after touching are equal or similar to each other, so that the operation range of a touch may be enlarged. In the related art, a signal difference occurs according to the distance between the connection part and the wire for connecting the long distance sensing electrode 200L2 and the short distance sensing electrode 200L1 and the range of the delta capacitance value is narrowed, so that the variable control range is reduced, causing limitation in the touch operation. However, according to the embodiment, the charge amount per a unit area is variously set in the wire for connecting the long distance sensing electrode and the short distance sensing electrode, so that the signal difference may be reduced. In addition, the same delta capacitance may be ensured, so that the range of the variables for controlling the touch operation may be enlarged, thereby improving the operation property.

According to the touch window of another embodiment, the sectional areas of the wire electrodes are set to be different from each other, so that the resistance deviation, which may occur in the length direction of the wire electrode, may be compensated, thereby preventing a signal from being distorted.

DETAILED DESCRIPTION OF THE EMBODIMENTS

Figure 1:
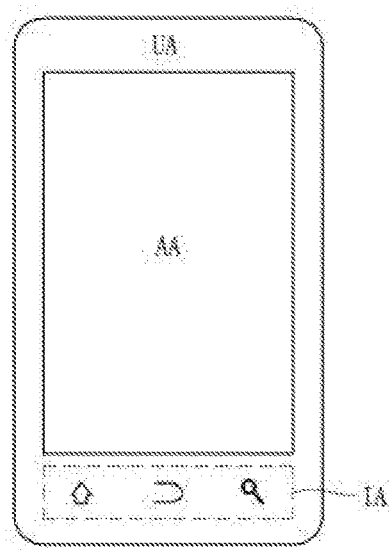
FIG. 1 is a plan view showing a touch window according to an embodiment.

In the description of the embodiments, it will be understood that, when a layer (or film), a region, a pattern, or a structure is referred to as being "on" or "under" another substrate, another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

The thickness and size of each layer (film), region, pattern, or structure shown in the drawings may be exaggerated, omitted or schematically drawn for the purpose of convenience or clarity. In addition, the size of each layer (film), region, pattern, or structure does not utterly reflect an actual size.

Hereinafter, embodiments will be described with reference to accompanying drawings.

Figure 2:
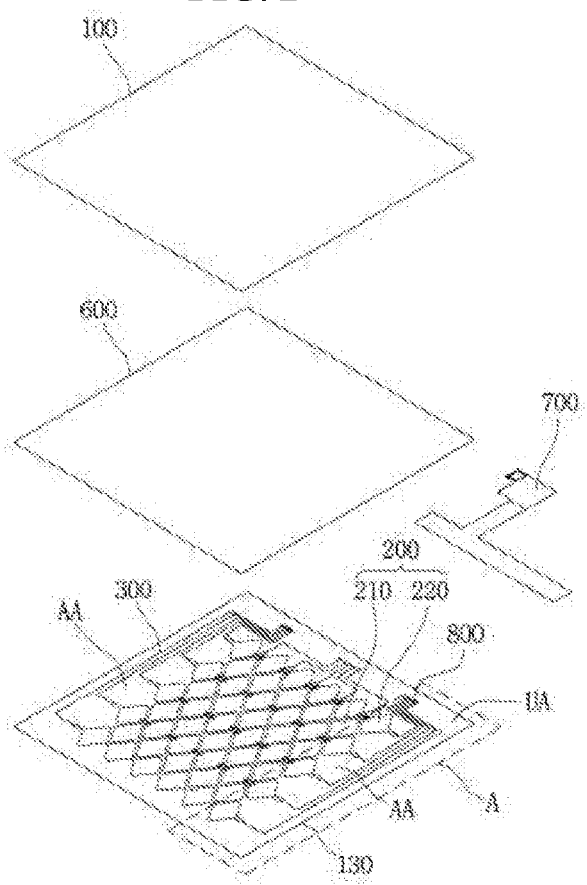
FIG. 2 is an exploded perspective view of a touch window according to an embodiment.

Referring to FIGS. 1 and 2, a touch window according to an embodiment may include a protective substrate 100 including a first area AA, a second area UA and a third area IA, a sensing electrode 200, a wire 300 and an instruction icon.

The protective substrate 100 may include glass or plastic. For example, the protective substrate 100 may include tempered glass, half-tempered glass, sodalime glass or strengthened plastic, but the embodiment is not limited thereto. The protective substrate 100 may include various materials capable of supporting the sensing electrode 200, the wire 300 and the instruction icon formed thereon.

In detail, the protective substrate 100 may be flexible or rigid. For example, the protective substrate 100 may include glass or plastic. In detail, the protective substrate 100 may include chemically tempered/half-tempered glass such as soda lime glass or aluminosilicate glass, reinforced or flexible plastic such as polyimide (PI), polyethylene terephthalate (PET), propylene glycol (PPG), or polycarbonate (PC), or sapphire.

In addition, the protective substrate 100 may include an optical isotropic film. For example, the protective substrate 100 may include cyclic olefin copolymer (COC), cyclic olefin polymer (COP), optical isotropic polycarbonate (PC), or optical isotropic polymethyl methacrylate (PMMA).

The sapphire has superior electric characteristics, such as permittivity, so that a touch response speed may be greatly increased and a space touch such as hovering may be easily implemented. In addition since the sapphire has a high surface hardness, the sapphire is applicable to a cover substrate. The hovering signifies a technique for recognizing a coordinate even in a position spaced apart from a display by a short distance.

In addition, the protective substrate 100 may be bent to have a partial curved surface. That is, the protective substrate 100 may be bent to have a partial flat surface and a partial curved surface. In detail, an end of the protective substrate 100 may be bent to have a curved surface or may be bent or flexed to have a surface including a random curvature.

Further, the protective substrate 100 may include a flexible substrate 100 having a flexible property.

In addition, the protective substrate 100 may include a curved or bended substrate 100. That is, a touch window including the protective substrate 100 may be formed to have a flexible, curved or bended property. For this reason, the touch window according to the embodiment may be easily portable and may be variously changed in design.

The protective substrate 100 may include the first area AA, the second area UA, and the third area IA.

The first area AA refers to an area in which a touch instruction of a user may be input. In other words, the first area AA refers to an area on which an image may be displayed and a touch may be sensed The second area UA surrounds the first area AA. The second area UA is arranged at an outer portion of the first area AA. An external circuit, which is connected to the wire 300, may be positioned in the second area UA. Meanwhile, a position may be sensed even in the second area UA.

An outer dummy layer is formed in the second area UA of the substrate 100. The outer dummy layer may be coated with a material having a predetermined color so that the wires 300 and a printed circuit board connecting the wires 300 to external circuits cannot be viewed from the outside. The outer dummy layer may have a color suitable for a desired outer appearance thereof. For example, the outer dummy layer includes black pigments to represent black. In addition, a desired logo may be formed in the outer dummy layer through various schemes. The outer dummy layer may be formed through deposition, print, and wet coating schemes.

The third area IA is provided at a portion of the second area UA. For example, as shown in FIG. 1, the third area IA may be provided at a lower end of the second area UA. In other words, the third area IA is an area provided at an edge of a display area and having the instruction icon arranged therein. The third area IA is lightened from a rear surface of the instruction icon by a light source, so that the user may easily distinguish among the instruction icons to input the corresponding instruction.

An electrode substrate 130 may be disposed under the protective substrate 100. Optical transparent adhesive 600 may be interposed between the protective substrate 100 and the electrode substrate 130 so that the protective substrate 100 and the electrode substrate 130 may be combined with each other.

The electrode substrate 130 may include poly ethylene terephthalate (PET), cyclic olefin copolymer (COC), cyclic olefin polymer (COP), optical isotropic polycarbonate (PC), or optical isotropic polymethyl methacrylate (PMMA).

The sensing electrode may be disposed on the electrode substrate 130. The sensing electrode 200 serves as a sensor for sensing a touch. In detail, the electrode substrate 130 may be provided with a first electrode 210 extending in one direction thereon and a second electrode 220 extending in another direction different from the one direction of the first electrode 210 thereon.

The first and second electrode 210 and 220 may be disposed on the same surface of the electrode substrate 130. Thus, the thickness of the touch window may be reduced so that the visibility is improved.

Meanwhile, although not shown, the first and second electrodes 210 and 220 may be disposed on the same surface of the protective substrate 100. Thus, the thickness of the touch window may be reduced so that the visibility is improved.

The sensing electrode 200 is depicted in a rhombus shape in the drawings but, the embodiment is not limited thereto. The sensing electrode 200 may be formed in various shapes such as a polygonal shape including a triangular shape and a rectangular shape, a circular shape, a linear shape, an H-shape or an elliptical shape.

The sensing electrode 200 may include a transparent conductive material that allows electricity to flow therethrough without interrupting transmission of light. For example, the sensing electrode 200 may include metal oxide such as indium tin oxide (ITO), indium zinc oxide, copper oxide, tin oxide, zinc oxide or titanium oxide.

In addition, the sensing electrode 200 includes various metals such as a nanowire, a light sensitive nanowire film, a carbon nanotube (CNT), or graphene, conductive polymer. For example, the sensing electrode 200 may include at least one metal of chrome (Cr), nickel (Ni), copper (Cu), aluminum (Al), silver (Ag), molybdenum (Mo) and an alloy thereof.

Next, the wire 300 is formed on the electrode substrate 130. The wire 300 may apply an electric signal to the sensing electrode 200. The wire 300 may include a material equal or similar to the sensing electrode 200.

One end of the wire 300 may be connected to the sensing electrode 200 and the other end may be connected to a printed circuit board 700. In detail, the wire 300 is connected to the sensing electrode 200 and drawn out to an upper or lower end of the substrate 100. In addition, the other end of the wire (300) may be provided with a connection part 800 to be connected to the printed circuit board 700.

In detail, the wire 300 may transfer the sensed touch signal from the first and second sensing electrodes 210 and 220 to the printed circuit board 700 on which a driving chip 710 is mounted to perform a touch operation. For example, the printed circuit board 700 may include a flexible printed circuit board (FPCB).

The charge amounts per a unit sectional area in the wire 300 may vary depending on positions in the wire 300. That is, the amounts of charges in sectional areas of the wire 300 may vary depending on positions in the wire 300.

For example, the amount of charges included in a sectional area of the wire 300 may be gradually increased as the wire 300 is away from the connection part 800.

To the contrary, the amount of charges included in a sectional area of the wire 300 may be gradually decreased as going away from the connection part 800.

That is, an amount of charges in one sectional area of the wire 300 disposed closely to the sensing electrode 200 may be greater than an amount of charges in one sectional area of the wire 300 disposed closely to the connection part 800.

The amount of charges of a sectional area of the wire 300 may be gradually increased as the wire 300 approaches from the connection part 800 to the sensing electrode 200.

In addition, the amount of charges of a sectional area of the wire 300 may be increased in stages as the wire 300 approaches from the connection part 800 to the sensing electrode 200. In other words, the wire 300 may have mutually different resistance values at mutually different positions. In detail, the resistance of the wire 300 may be gradually decreased as going away from the connection part 800.

The resistance of the wire 300 is varied according to the distance from the connection part 800, so that a signal difference may occur between a long distance sensing electrode 200L2 disposed at a long distance L2 from the connection part 800 and a short distance sensing electrode 200L1 disposed at a short distance L1 from the connection part 800. That is, the signal difference occurs due to mutually different current speeds between the wire 300 of connecting the long distance sensing electrode 200L2 and the wire 300 of connecting the short distance sensing electrode 200L1.

Therefore, according to the embodiment, since the amount of charge per a unit area is variously set in the wire 300, the touching operations on the long distance sensing electrode 200L2 and the short distance sensing electrode 200L1 may be stably performed. That is, by minimizing the signal difference between the long distance sensing electrode 200L2 and the short distance sensing electrode 200L1, the differences (delta capacitance) between capacitance values before and after touching are equal or similar to each other, so that the operation range of a touch may be enlarged. In the related art, a signal difference occurs according to the distance between the connection part and the wire for connecting the long distance sensing electrode 200L2 and the short distance sensing electrode 200L1 and the range of the delta capacitance value is narrowed, so that the variable control range is reduced, causing limitation in the touch operation. However, according to the embodiment, the charge amount per a unit area is variously set in the wire 300 for connecting the long distance sensing electrode 200L2 and the short distance sensing electrode 200L1, so that the signal difference may be reduced. In addition, the same delta capacitance may be ensured, so that the range of the variables for controlling the touch operation may be enlarged, thereby improving the operation property.

Figure 4:
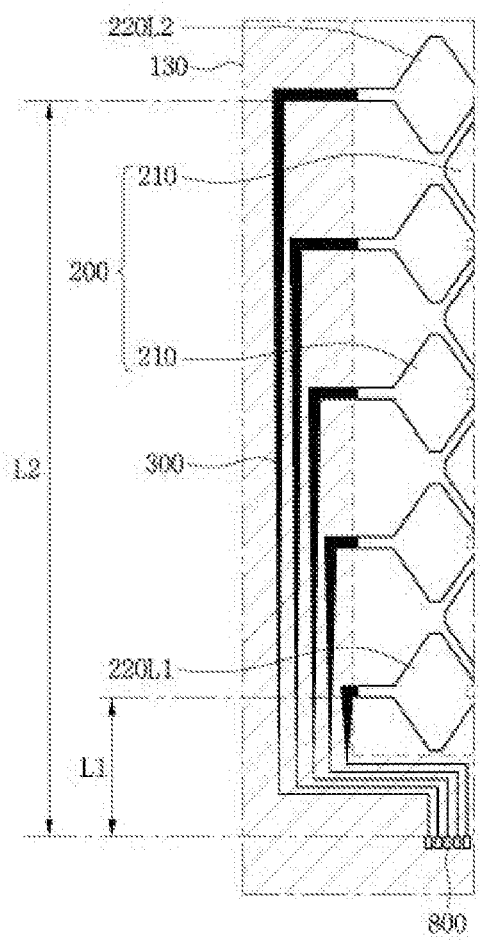
FIG. 4 is an enlarged view showing a touch window according to an embodiment.

Meanwhile, referring to FIG. 4, the amount of charges per each sectional area in the wire 300 may be adjusted through a line width of the wire 300

In detail, the charge amount of the sectional area may be changed by changing the line width of the wire 300. For example, the line width of the wire 300 may be gradually increased as the wire 300 is away from the connection part 800.

In addition, the line width of the wire 300 may be gradually decreased as the wire 300 is away from the connection part 800. That is, in the embodiment, the sectional area of the wire 300 may be increased and decreased through the increase and decrease of the sectional area of the line width of the wire 300, so that the amount of charges included in one sectional area can be varied.

Figure 12:
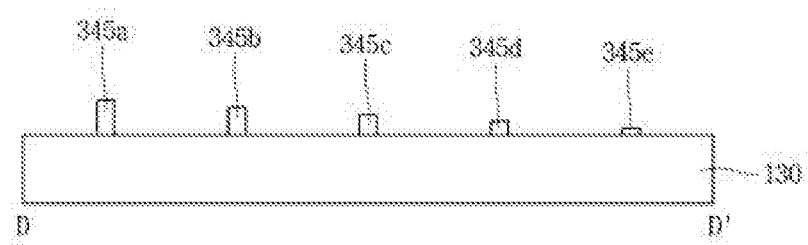
FIG. 12 is a sectional view taken along line D-D' of FIG. 11.

In addition, as shown in FIG. 12, the amount of charges per a unit area in the wire 300 may be controlled through the thickness of the wire 300. That is, the wire 300 may have the same line width and the thickness thereof may be varied. In detail, the thickness of the wire 300 may be gradually increased as the wire 300 is away from the connection part 800. To the contrary, the thickness of the wire 300 may be gradually decreased as going away from the connection part 800.

In addition, the charge amount may be controlled by increasing the amount of charges per a unit area while regularly maintaining the line width and thickness of the wire 300. For example, the charge amount per unit area of the wire 300 may be gradually increased as the wire 300 is away from the connection part 800. To the contrary, the charge amount per unit area of the wire 300 may be gradually decreased as going away from the connection part 800.

Hereinafter, various embodiments capable of controlling the charge amount of a wire will be described with reference to FIGS. 5 to 12.

In the following description about various embodiments, the parts similar or identical to those of the above described embodiment will be omitted for the purpose of clear and brief description.

Figure 5:
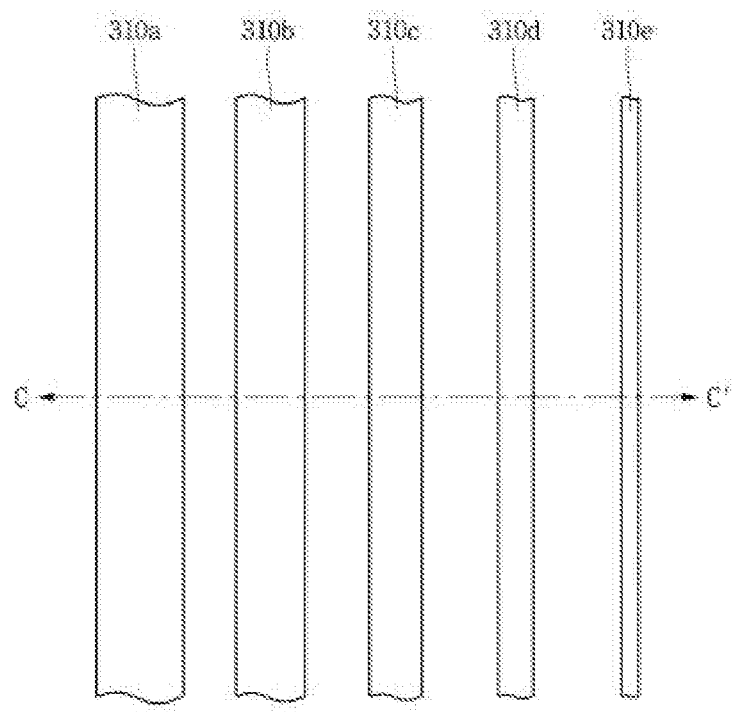
FIG. 5 is an enlarged view of portion A of FIG. 3 according to another embodiment.
Figure 6:
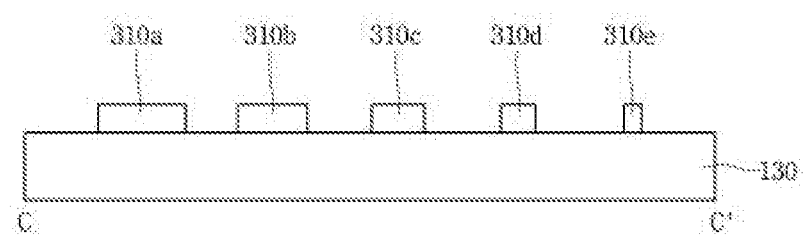
FIG. 6 is a sectional view taken along line C-C' of FIG. 5.

First, referring to FIGS. 5 and 6, according to another embodiment, the plurality of wires 310*a*, 310*b*, 310*c*, 310*d* and 310*e* having mutually different widths may be formed. Since the resistance values of the wires 310*a*, 310*b*, 310*c*, 310*d* and 310*e* are proportional to the lengths and inversely proportional to the sectional areas, the wires 310*a*, 310*b*, 310*c*, 310*d* and 310*e* may be formed to have mutually different widths in order to allow the wires 310*a*, 310*b*, 310*c*, 310*d* and 310*e* to have uniform resistance values.

For example, since the first wire 310*a* has the longest length, the first wire 310*a* is allowed to have the widest width so that the resistance value may be compensated. Since the fifth wire 310*e* has the shortest length, the fifth wire 310*e* is allowed to have the narrowest width, so that the resistance value is equal to that of the first wire 310*a*.

That is, the widths of the wires 310*a*, 310*b*, 310*c*, 310*d* and 310*e* may be proportional to the distances between the sensing electrodes and connection part connected to each of the wire 310*a*, 310*b*, 310*c*, 310*d* and 310*e*.

In addition, widths of the wires 310*a*, 310*b*, 310*c*, 310*d* and 310*e* may become reduced as the wires 310*a*, 310*b*, 310*c*, 310*d* and 310*e* are closer to the active area AA.

By controlling the widths of the wire 310*a*, 310*b*, 310*c*, 310*d* and 310*e*, the resistance deviation between the wire 310*a*, 310*b*, 310*c*, 310*d* and 310*e* may be reduced and the distortion in exchanging a signal between the printed circuit board and the sensing electrode may be reduced.

Since the distortion can be reduced upon signal exchange, the touch can be accurately sensed.

Figure 7:
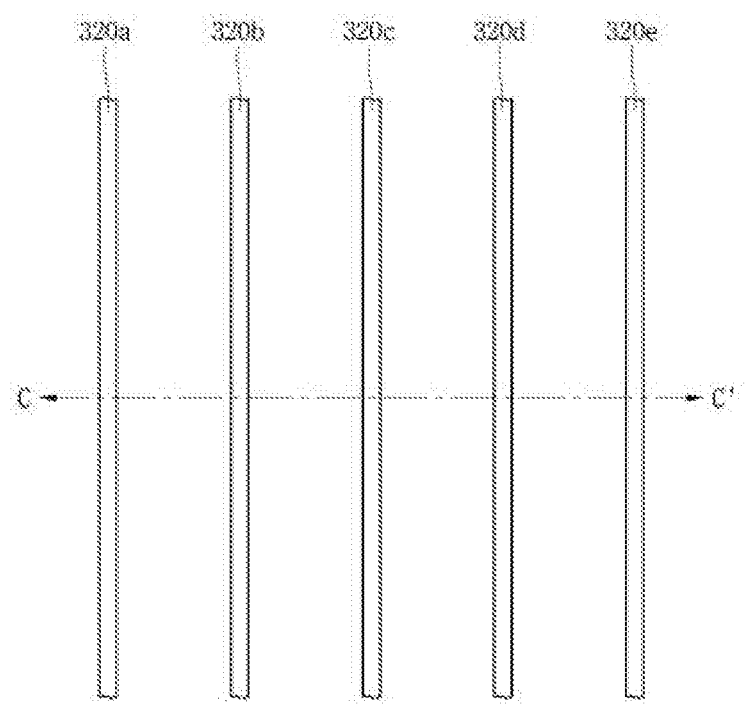
FIG. 7 is an enlarged view of portion A of FIG. 3 according to still another embodiment.
Figure 8:
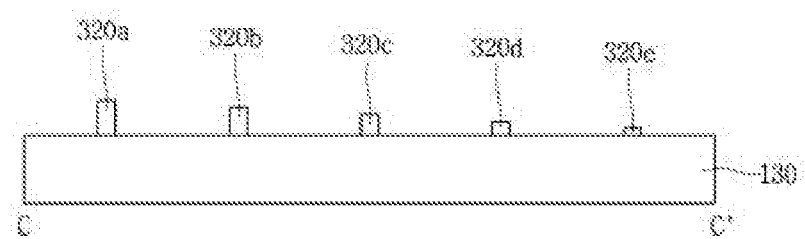
FIG. 8 is a sectional view taken along line C-C' of FIG. 7.

Meanwhile, referring to FIGS. 7 and 8, according to still another embodiment, the wires 310*a*, 310*b*, 310*c*, 310*d* and 310*e* may have mutually different lengths.

Since the distances between the plurality of second sensing electrode and the connection part are different from each other, the wire 320*a*, 320*b*, 320*c*, 320*d* and 320*e* for connecting the second sensing electrodes and the connection part to each other have mutually different lengths.

For example, if the number of wires 320*a*, 320*b*, 320*c*, 320*d* and 320*e* is five, the first wire 320*a* may have the longest length and the fifth wire 320*e* may have the shortest length.

The first wire 320*a* may be connected to a sensing electrode spaced farthest apart from the connection part and the fifth wire 320*e* may be connected to a sensing electrode nearest to the connection part.

The plurality of wires 320*a*, 320*b*, 320*c*, 320*d* and 320*e* may have mutually different thicknesses. Since the resistance values of the wires 320*a*, 320*b*, 320*c*, 320*d* and 320*e* are proportional to the lengths and inversely proportional to the sectional areas, the wires 320*a*, 320*b*, 320*c*, 320*d* and 320*e* may be formed to have mutually different thicknesses in order to allow the wires 320*a*, 320*b*, 320*c*, 320*d* and 320*e* to have uniform resistance values. The wire 320*a*, 320*b*, 320*c*, 320*d* and 320*e* may be set to have mutually different thicknesses to allow wire 320*a*, 320*b*, 320*c*, 320*d* and 320*e* to have mutually different areas, so that the deviation between the resistance values may be compensated.

For example, since the first wire 320*a* has the longest length, the first wire 320*a* is allowed to have the thickest thickness, so that the resistance value may be compensated. Since the fifth wire 320*e* has the shortest length, the fifth wire 320*e* is allowed to have the thinnest thickness, so that the resistance value is equal to that of the first wire 320*a*.

That is, the thicknesses of the wires 320*a*, 320*b*, 320*c*, 320*d* and 320*e* may be proportional to the distances between the sensing electrodes and the connection part connected to each of the wire 320*a*, 320*b*, 320*c*, 320*d* and 320*e*.

In addition, thicknesses of the wires 320*a*, 320*b*, 320*c*, 320*d* and 320*e* may become reduced as the wires 320*a*, 320*b*, 320*c*, 320*d* and 320*e* are closer to the active area AA.

By controlling the thicknesses of the wire 320*a*, 320*b*, 310*c*, 320*d* and 320*e*, the resistance deviation between the wire 310*a*, 310*b*, 310*c*, 310*d* and 310*e* may be reduced and the distortion in exchanging a signal between the printed circuit board and the sensing electrode may be reduced.

Since the distortion can be reduced upon signal exchange, the touch can be accurately sensed.

Figure 3:
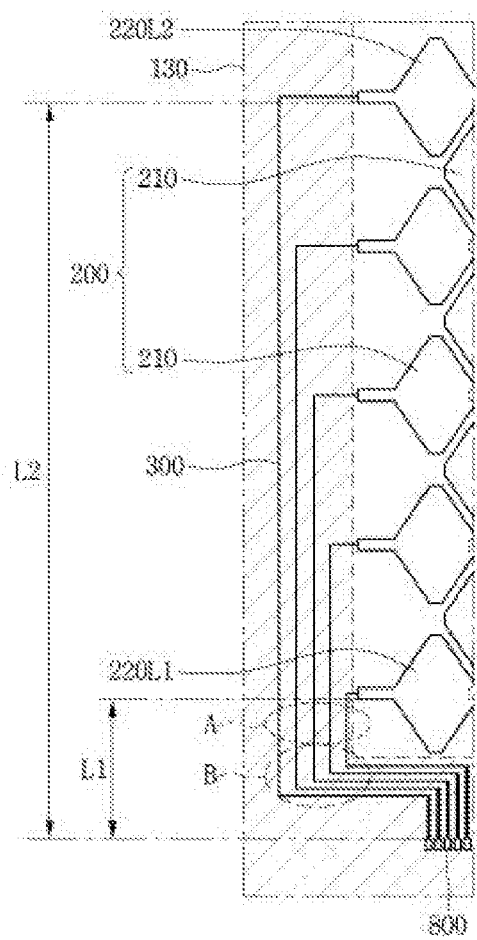
FIG. 3 is an enlarged view of portion A of FIG. 2.
Figure 9:
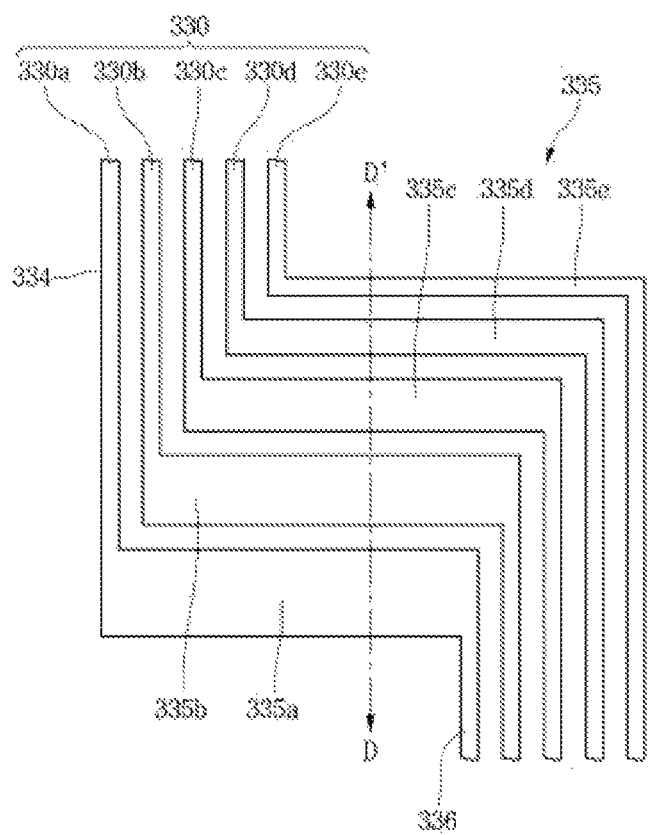
FIG. 9 is an enlarged view of portion B of FIG. 3 according to still another embodiment.
Figure 10:
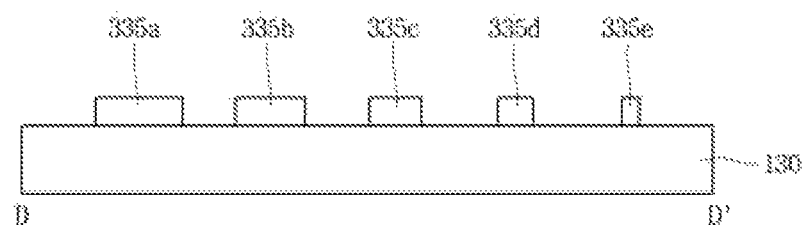
FIG. 10 is a sectional view taken along line D-D' of FIG. 9.

Referring to FIGS. 3, 9 and 10, a plurality of wires 330 according to the third embodiment each may include first to third wire lines 334 to 336.

The first wire line 334 may be electrically connected to the sensing electrode and the third wire line 336 may be electrically connected to the connection part. The second wire line 335 may be interposed between the first and third wire lines 334 and 336 to connect the first and third wire lines 334 and 336 to each other.

The first and third wire lines 334 and 336 may be formed in the second direction crossing the sensing electrode, and the second wire line 335 may be formed in the first direction crossing to the first wire line 334.

The plurality of second wire lines 335 may be formed to have mutually different widths. Since the resistance value of the wire 330 is proportional to the length and inversely proportional to the sectional area, the second wire lines 335 may be formed to have mutually different widths in order to allow the entire wire 330 to uniformly have a resistance value. The second wire lines 335 may be set to have mutually different widths to allow the second wire lines 335 to have mutually different sectional areas, so that the deviation between the wires 330 may be compensated.

For example, since the first wire line 330*a* has the longest length, the second wire line 335*a* of the first wire 330*a* is allowed to have the widest width so that the resistance value may be compensated. Since the fifth wire 330*e* has the shortest length, the second wire line 335*e* of the fifth wire 330*e* is allowed to have the narrowest width, so that the resistance value may be made to be equal to that of the first wire 330*a*.

That is, the widths of the second wire lines 335 may be proportional to the distances between the sensing electrode and connection part connected to each wire 330.

In addition, the width of the second wire lines 335 may become reduced as the wire is closer to the active area AA.

By controlling the widths of the second wire lines 335, the resistance deviation between the wires 330 may be reduced and the distortion in exchanging a signal between the printed circuit board and the sensing electrode may be reduced.

Since the distortion can be reduced upon signal exchange, the touch can be accurately sensed.

The bezels on the left and right side surfaces of the touch window may be reduced by changing the widths of the second wire lines 335 formed in the second area UA which is relatively large. That is, by varying the width of the second wire line 335 rather than the width of the first wire line 334 directly related to the width of the bezel, the distortion upon signal exchange may be reduced without exerting an effect on the bezels of the left and right side surfaces of the touch window.

Figure 11:
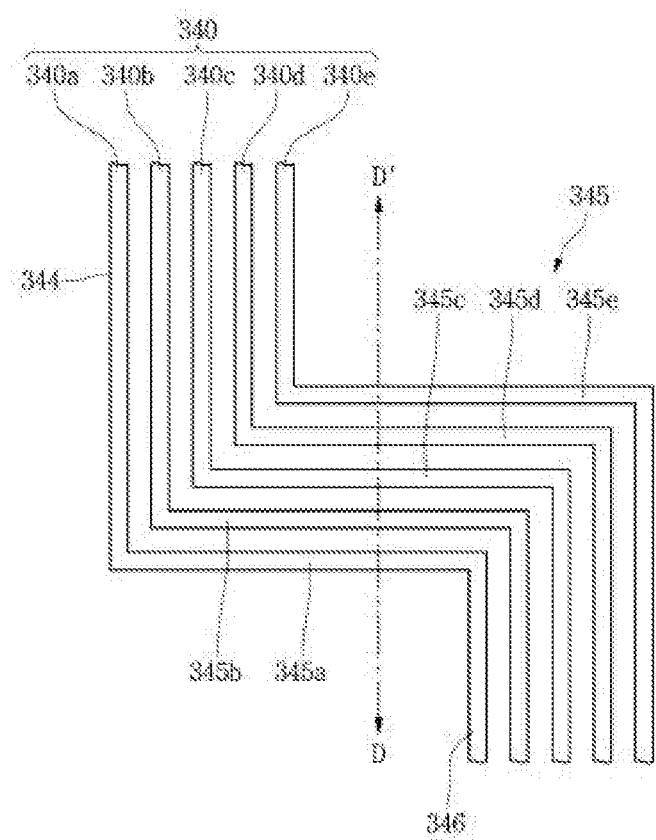
FIG. 11 is an enlarged view of portion B of FIG. 3 according to still another embodiment.

Referring to FIGS. 11 and 12 together with FIG. 2, a plurality of wires 340 according to still another embodiment each may include first to third wire lines 344 to 346.

The first wire line 344 may be electrically connected to the sensing electrode and the third wire line 346 may be electrically connected to the connection part. The second wire line 345 may be interposed between the first and third wire lines 344 and 346 to connect the first and third wire lines 344 and 346 to each other.

The first and third wire lines 344 and 346 may be formed in the second direction crossing the sensing electrode, and the second wire line 345 may be formed in the first direction crossing to the first wire line 344.

The plurality of second wire lines 345 may have mutually different thicknesses. Since the resistance value of the wire 340 is proportional to the length and inversely proportional to the sectional area, the second wire lines 345 may be formed to have mutually different thicknesses in order to uniform the resistance values of the wires 340. The second wire lines 345 may be set to have mutually different thicknesses to allow the second wire lines 345 to have mutually different sectional areas, so that the deviation between the wires 340 may be compensated.

For example, since the first wire line 340a has the longest length, the second wire line 345a of the first wire 340a is allowed to have the thickest thickness so that the resistance value may be compensated. Since the fifth wire 340e has the shortest length, the second wire line 345e of the fifth wire 340e is allowed to have the thinnest thickness, so that the resistance value may be made to be equal to that of the first wire 340a.

That is, the thicknesses of the second wire lines 345 may be proportional to the distances between the sensing electrode and connection part connected to each wire 340.

In addition, the thickness of the second wire lines 345 may become reduced as the wire is closer to the active area AA.

By controlling the thicknesses of the second wire lines 345, the resistance deviation between the wires 340 may be reduced and the distortion can be reduced upon signal exchange between the printed circuit board and the sensing electrode.

Since the distortion can be reduced upon signal exchange, the touch can be accurately sensed.

The yield of the touch window may be improved by changing the thicknesses of the second wire lines 345 formed in the second area UA which is relatively large. That is, by varying the thickness of the second wire line 345 rather than the thickness of the first wire line 344 formed on the relatively narrow second area UA, an error, which may be generated when forming the wires 340 having mutually different thicknesses, may be prevented so that the product yield may be improved.

Figure 13:
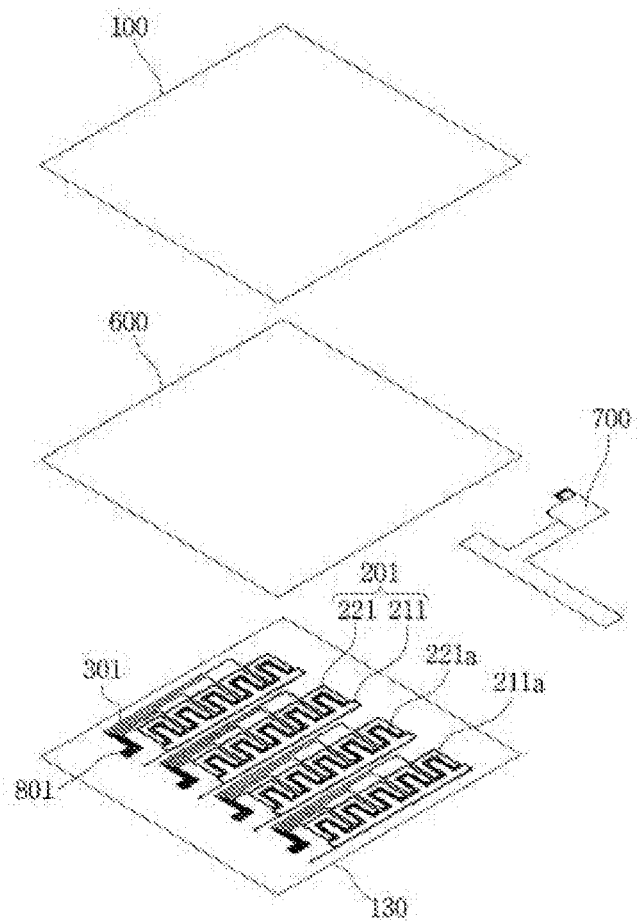
FIG. 13 is an exploded perspective view of a touch window according to another embodiment.
Figure 14:
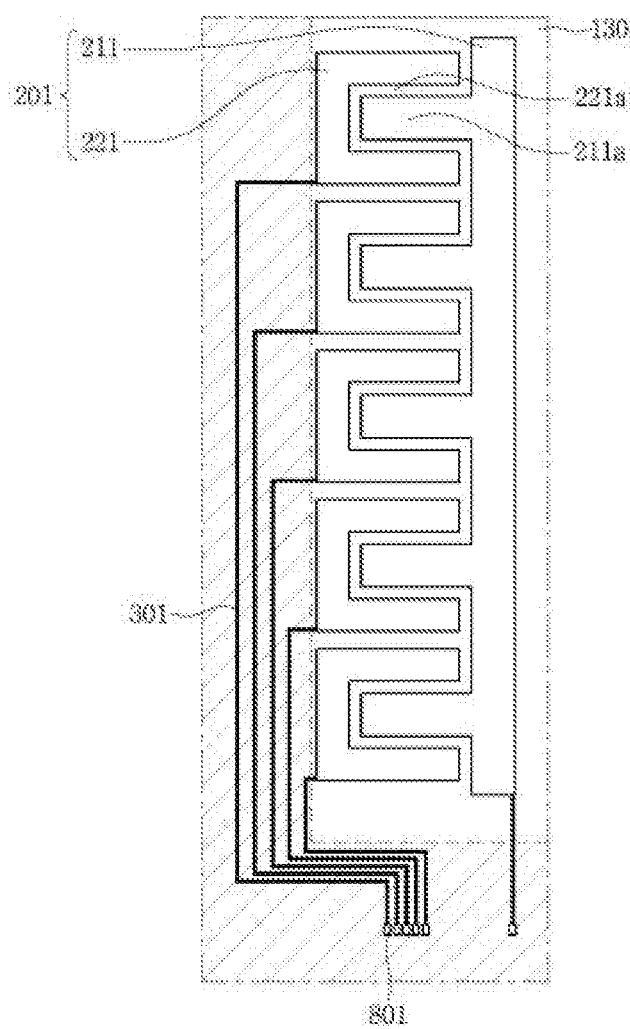
FIGS. 14 to 16 are enlarged views of touch windows according to various embodiments.

Meanwhile, referring to FIGS. 13 and 14, in a touch window according to another embodiment, the sensing electrode 201 includes first and second electrodes 211 and 221, and the first and second electrodes 211 and 221 are disposed on the same surface of the electrode substrate 130.

The second electrode 221 includes a concave part 221a. The concave part 221 may have a shape concaved in one direction.

The first electrode 211 includes a convex part 211a. The convex part 211a may have a shape protruding in one direction. The convex part 211a may be disposed in the concave part 221a. That is, the concave and convex parts 221a and 211a are engaged with each other. Thus, the first and second electrodes 211 and 221 may be disposed on the same surface.

Figure 15:
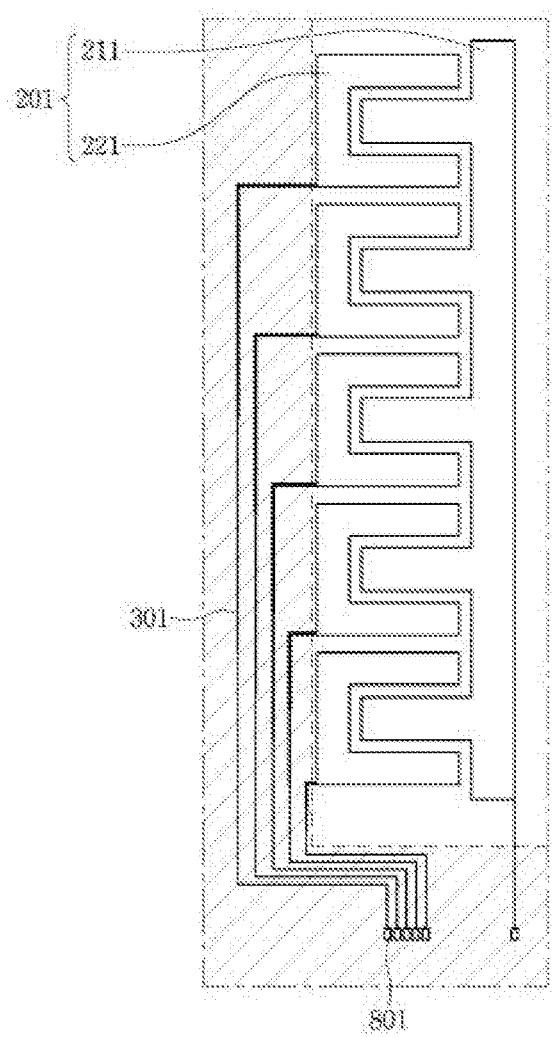

Referring to FIG. 15, line widths of the wires 301 connected to the sensing electrode 201 may be different from each other. That is, the line width of the wire 301 may be gradually increased as the wire is away from the connection part 801.

Meanwhile, although not shown in the drawings, the amount of charges per a unit area in the wire 301 may be controlled by adjusting the thickness of the wire 301. That is, the wires 301 may have the same line width, but the thicknesses may be different from each other. In detail, the thickness of the wire 300 may be gradually increased as the wire 300 is away from the connection part 801.

Figure 16:
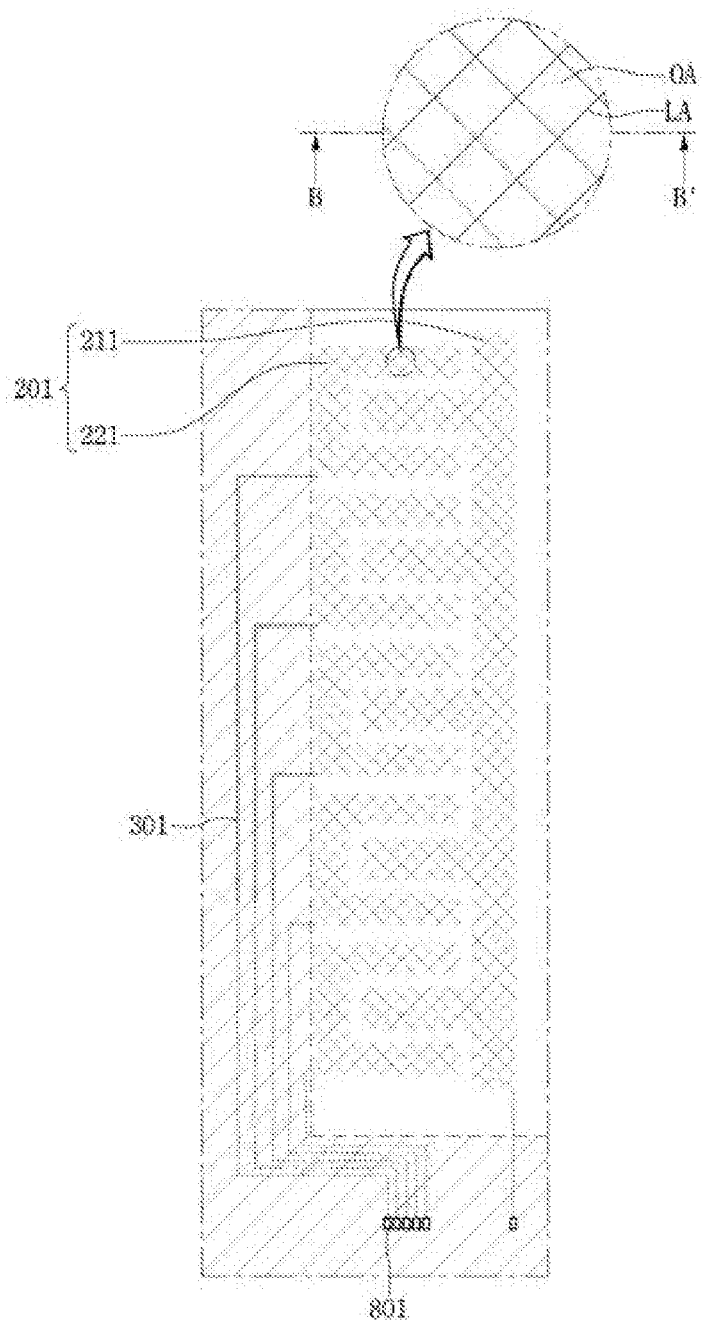

Meanwhile, referring to FIG. 16, the sensing electrode 201 may include a conductive pattern. In this case, the mesh pattern may be formed in random to prevent a moire phenomenon. In addition, the wire 301 connecting the sensing electrodes 201 to each other may include the conductive pattern. The moire phenomenon occurs when periodical stripes overlap with each other. Since adjacent stripes overlap with each other, a thickness of a stripe is thickened so that the stripe is spotlighted as compared with other stripes. Thus, in order to prevent such a moire phenomenon, the conductive pattern may be provided in various shapes.

The sensing electrode 201 and the wire 301 may include conductive patterns equal or similar to each other.

The sensing electrode includes a conductive pattern opening part OA and a conductive pattern line LA. In this case, the conductive pattern line LA may have a line width in the range of 0.1 μm to 10 μm. If the line width is equal to or less than 0.1 μm, it may be impossible to fabricate the conductive pattern line LA. When the line width is equal to or less than 10 μm, the pattern of the sensing electrode 201 may be not viewed. Preferably, the conductive pattern line LA may have a line width in the range of 1 μm to 7 μm. More preferably, the conductive pattern line LA may have a line width in the range of 2 μm to 5 μm.

Meanwhile, as shown in FIG. 16, the conductive pattern may have a regular shape. That is, the conductive pattern opening part OA may have a rectangular shape, but the embodiment is not limited thereto. The conductive pattern opening part OA may have various shapes such as a diamond shape, a pentagon shape, or a hexagonal shape, or a circular shape.

In addition, the embodiment is not limited to the above. The conductive pattern may have an irregular shape. That is, various conductive pattern opening parts may be included in a single conductive pattern. Thus, the sensing electrode 201 may include a conductive pattern opening part which may have various shapes.

Since the sensing electrode 201 and the wire 301 have a mesh shape, the patterns of the sensing electrode 201 and the wire 301 may not be viewed. That is, even if the sensing electrode 201 and the wire 301 are formed of a metal, the patterns may not be viewed. In addition, even if the sensing electrode 201 and the wire 301 are applied to a large-size touch window, the resistance of the touch window may be lowered. In addition, even when the sensing electrode 201 and the wire 301 are formed through a printing process, the printing quality may be improved so that the high-quality touch window may be ensured.

Meanwhile, since the first and second electrode 211 and 221 are disposed on the same surface of the electrode substrate 130, the thickness of the touch widow may be reduced and the visibility may be improved. That is, when the first and second electrodes 211 and 221 are formed on mutually different electrode substrates, the thickness may be increased, and the conductive patterns of the first and second electrodes overlap with each other when viewed from the top so that moire phenomenon may occur. However, according to the embodiment, the first and second electrodes are disposed on one surface so that the moire phenomenon may be prevented from occurring.

In addition, since the sensing electrode 201 includes the conductive pattern, the bending property and reliability of the touch window may be improved.

In this case, the density of the conductive pattern may vary in the wire 301. In detail, the density of the conductive pattern may be gradually increased as the conductive pattern is away from the connection part 801. Thus, the amount of charges in the sectional area of the wire 301 may be gradually increased as the wire 301 is away from the connection part 801.

Figure 17:
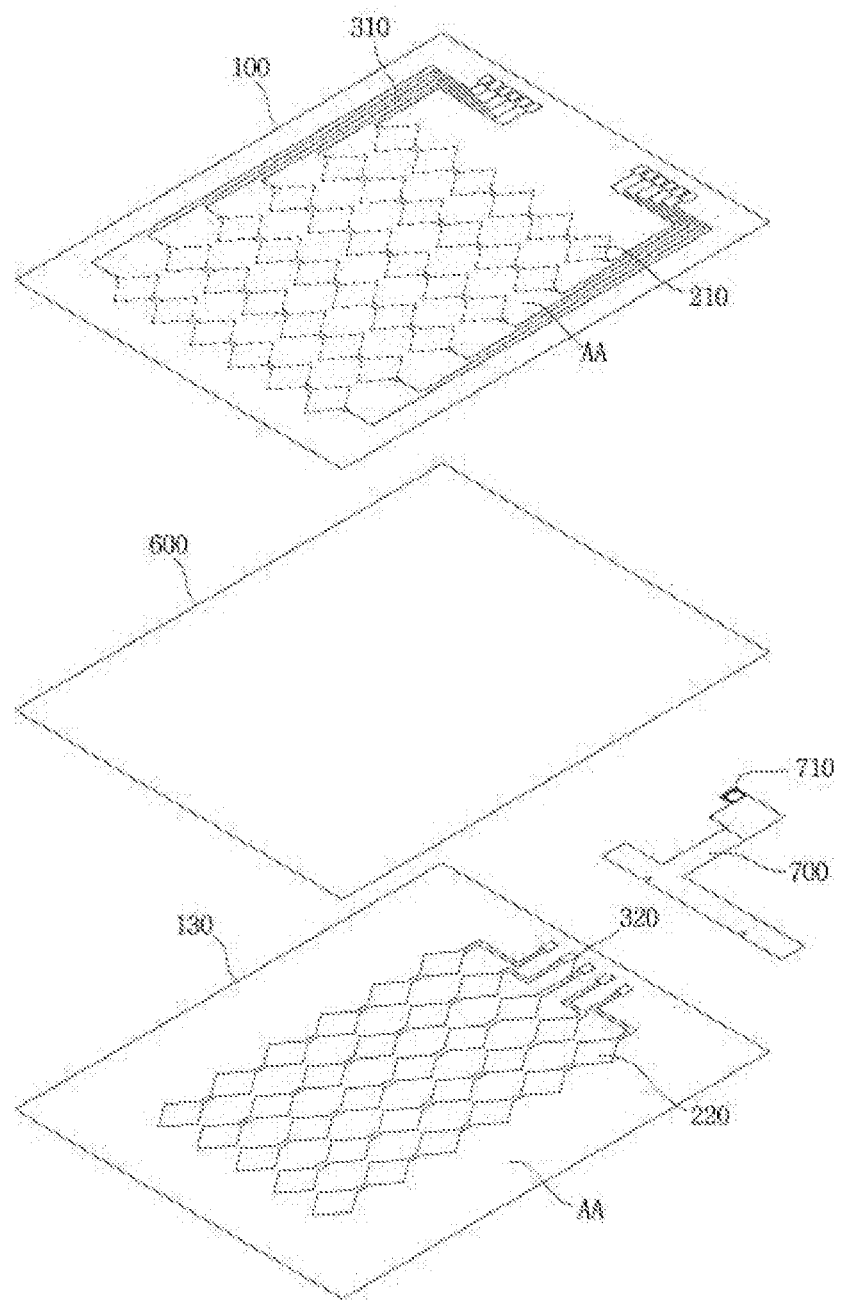
FIGS. 17 to 20 are exploded perspective views of a touch window according to still another embodiment.

Meanwhile, referring to FIG. 17, the first electrode 210 may be formed on one surface of the protective substrate 100, and the second electrode 220 may be formed on one surface of the electrode substrate 130 disposed on the protective substrate 100. Optical transparent adhesive 600 may be interposed between the protective substrate 100 and the electrode substrate 130.

Figure 18:
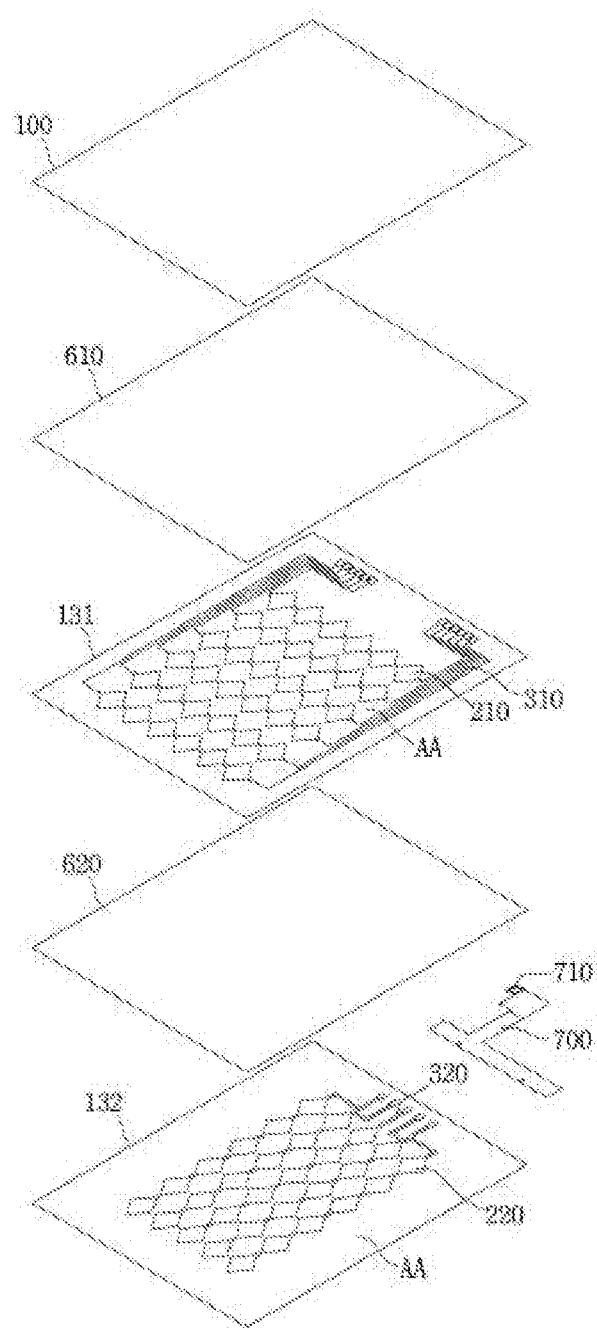

Meanwhile, referring to FIG. 18, the first electrode 210 may be formed on a first electrode member 131 disposed on the protective substrate 100, and the second electrode 220 may be formed on a second electrode member 132 disposed on the first electrode member 131. Optical transparent adhesives 610 and 620 may be disposed among the protective substrate 100, the first electrode member 131 and the second electrode member 132.

Figure 19:
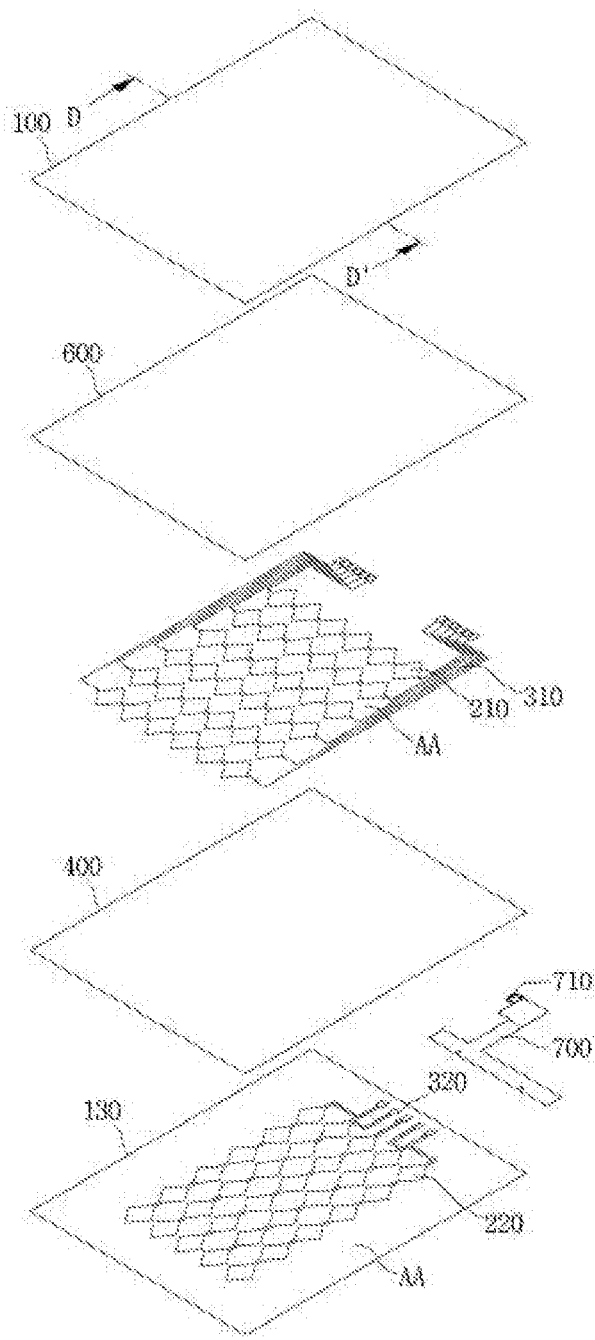

Referring to FIG. 19, an intermediate layer 400 may be disposed on the electrode substrate 130. The intermediate layer 400 may be disposed on the second electrode 220. The intermediate layer 400 may support the first electrode 210. At the same time, the intermediate layer 400 may insulate the first and second electrodes 210 and 220 from each other.

The intermediate layer 400 may include a material different from the electrode substrate 130. The intermediate layer 400 may include a dielectric material.

For example, the intermediate layer 400 may include an insulating group including halogen compound of alkali metal or alkali earth metal, such as LiF, KCl, CaF2, or MgF2, or fused silica, such as SiO2, SiNX, etc.; a semiconductor group including InP or InSb; transparent oxide used for semiconductor or dielectric substance including In compound, such as ITO or IZO, mainly used for a transparent electrode, or transparent oxide used for semiconductor or dielectric substance, such as ZnOx, ZnS, ZnSe, TiOx, WOx, MoOx, or ReOx; an organic semiconductor group including Alq3, NPB, TAPC, 2TNATA, CBP or Bphen; and a low-K material such as silsesquioxane or a derivative ((H—SiO3/2)n) thereof, methylsilsesquioxane (CH3—SiO3/2)n), porous silica or porous silica doped with fluorine or carbon atoms, porous zinc oxide (ZnOx), cyclized-perfluoropolymer (CYTOP) or a mixture thereof. The intermediate layer 400 may have visible ray transmittance of 79% to 99%.

In this case, a thickness of the intermediate layer 400 may be less than a thickness of the protective substrate 100. The thickness T2 of the intermediate layer 400 may be less than a thickness T1 of the electrode substrate 130. In detail, the thickness T2 of the intermediate layer 400 may be 0.05 to 0.5 times the thickness T1 of the electrode substrate 130. For example, when the thickness T1 of the electrode substrate 130 may be equal to 0.05 mm, the thickness T2 of the intermediate layer 400 may be equal to 0.005 mm.

The intermediate layer 400 may be directly formed on the top surface of the electrode substrate 130. That is, the intermediate layer 400 may be formed by directly coating a dielectric material on the top surface of the electrode substrate 130. Then, the first electrode 210 may be formed on the intermediate layer 120.

The touch window having a thin thickness is secured through the intermediate layer 400, so that the transmittance may be improved and the first or second electrode 210 or 220 may be prevented from being cracked. Therefore, the bending property and reliability of the touch window may be improved.

Figure 20:
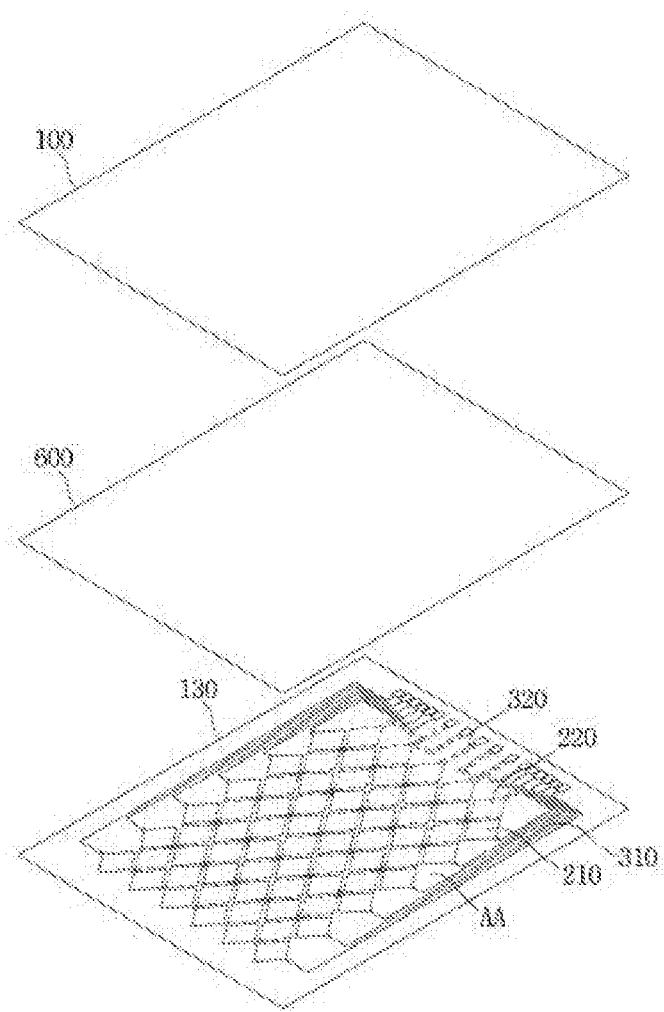

Meanwhile, referring to FIG. 20, the first electrode 210 may be formed on one surface of the electrode substrate 130 disposed on the protective substrate 100, and the second electrode 220 may be formed on the opposite surface of the electrode substrate 130. Thus, the thickness of the touch window may be reduced.

Figure 21:
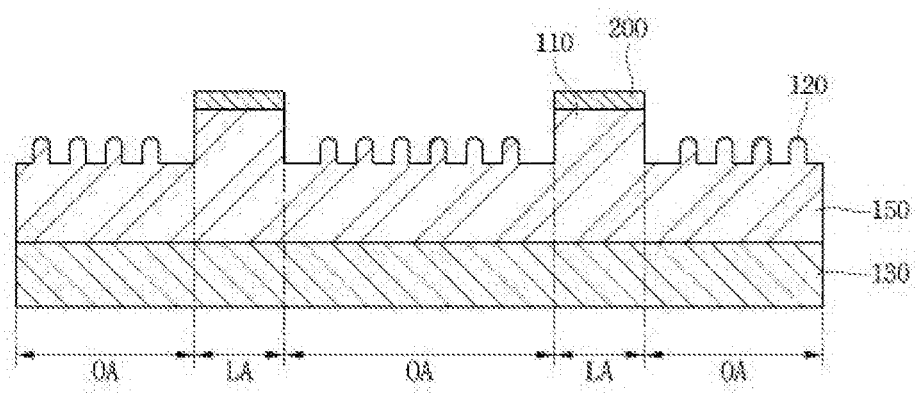
FIGS. 21 to 25 are sectional views taken along line B-B' of FIG. 16.

Referring to FIG. 21, the touch window may include first and second sub-patterns 110 and 120, and an electrode layer 200.

The first sub-pattern 110 is disposed on the electrode substrate 130. The first sub-pattern 110 is disposed on the mesh line LA. Thus, the first sub-pattern 110 may be formed in a mesh shape. The first sub-pattern may be embossed.

The second sub-pattern 120 is disposed on the electrode substrate 130. The second sub-pattern 120 is disposed on the mesh opening part OA. Thus, the second sub-pattern may be interposed between the first sub-patterns 110. The second sub-pattern 120 may be embossed.

The first and second sub-patterns 110 and 120 may include resin or polymer. The first and second sub-patterns 110 and 120 may be formed through an imprinting process. That is, the first and second sub-patterns 110 and 150 may be formed through a mold having a pattern desired to be formed on a resin layer 150.

The electrode layer 200 is disposed on the first sub-pattern 110. Thus, the electrode layer 200 is disposed on the mesh line LA and is disposed in a mesh shape. The electrode layer 200 may include various kinds of metals having excellent conductivity. For example, the electrode layer 200 may include Cu, Au, Ag, Al, Ti, Ni or the alloy thereof.

An electrode material may be formed on the first and second sub-patterns 110 and 120. The electrode material may be formed through a deposition or plating scheme.

Next, the electrode material may be etched. In this case, an etch area may vary depending on structures of the first sub-pattern 110 and the second sub-pattern 120 and a bonding area with respect to the electrode material. That is, since the bonding contact area between the first sub-pattern 110 and the electrode material is larger than the bonding area between the second sub-pattern 120 and the electrode material, the electrode material formed on the first sub-pattern 110 is less etched. That is, the electrode material remains on the first sub-pattern 110 and the electrode material formed on the second sub-pattern 120 is etched and removed under the same etching rate. Accordingly, an electrode layer 200 may be formed on the first sub-pattern 110 and may be arranged in the mesh shape.

Figure 22:
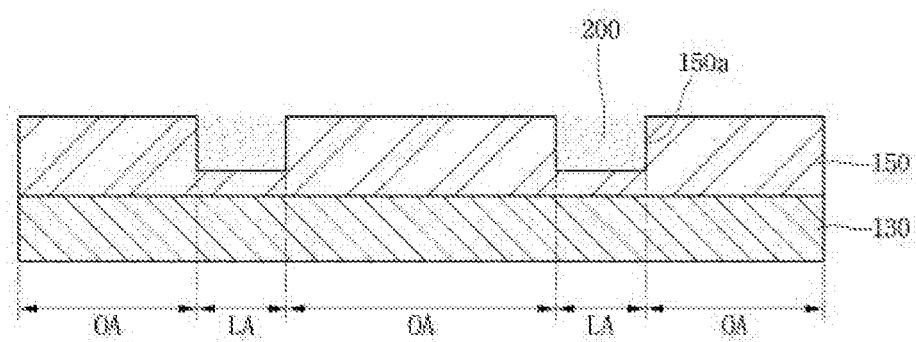

Referring to FIG. 22, a resin layer 150 is provided on the electrode substrate 130. The resin layer 150 may include an intaglio part 150a. In this case, the sensing electrode 200 may be provided in the intaglio part 150a. In other words, the sensing electrode 200 may be formed by filling the intaglio parts 150a with an electrode material. Accordingly, when comparing with deposition and photolithography processes according to the related art, the number of processes, the process time, and the process cost may be reduced.

Figure 23:
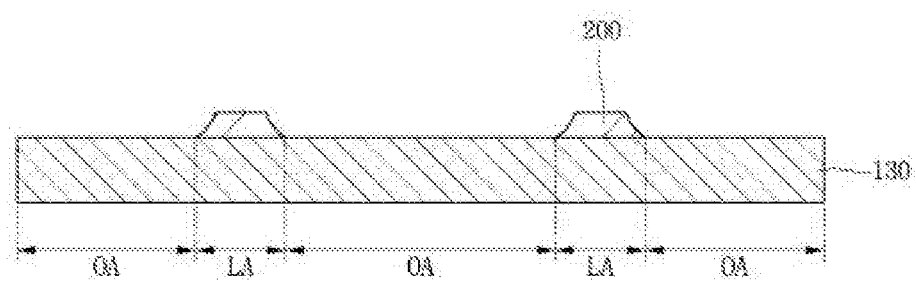

Referring to FIG. 23, the sensing electrode 200 having the conductive pattern may be formed by etching a metallic material on the electrode substrate 130. For example, the sensing electrode 200 may be formed by performing metal etching after Cu is deposited on the electrode substrate 130.

Figure 24:
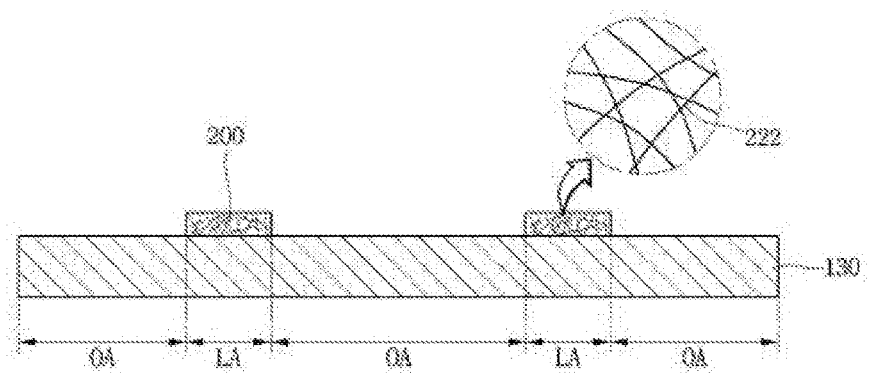

Referring to FIG. 24, the sensing electrode 201 may include an interconnecting structure 222. The interconnecting structure 222 may be a micro-structure having a diameter of 10 nm to 200 nm. For example, the sensing electrode 200 may include a nanowire. The sensing electrode 200 may include a metallic-nanowire.

Figure 25:
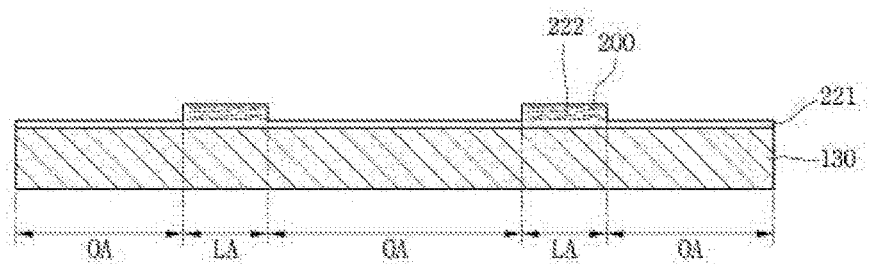

Referring to FIG. 25, the sensing electrode 200 may include a preform 221 and a nanowire 222. The preform 221 includes a sensitive material. The preform 221 includes the photosensitive material, so that the sensing electrode 200 may be formed through exposure and development processes.

The sensing electrode 200 may include a sensitive nanowire film. The sensing electrode 200 includes the sensitive nanowire film, so that the thickness of the sensing electrode 200 may be reduced. In other words, the sensing electrode 200 includes nanowires, and the whole thickness of the sensing electrode 200 may be reduced. Conventionally, when the sensing electrode includes the nanowires, an overcoating layer must be additionally formed to prevent the nanowires from being oxidized, so that the fabricating process may be complicated, and the thickness of the touch window may be reduced. However, according to the present embodiment, the nanowires are provided in the sensitive material so that the nanowires may be prevented from being oxidized without the overcoating layer.

As shown in FIGS. 26 to 33, the touch window may be disposed on a display panel serving as a driving pat. The touch window may be combined with the display panel, so that a display device may be implemented.

Figure 26:
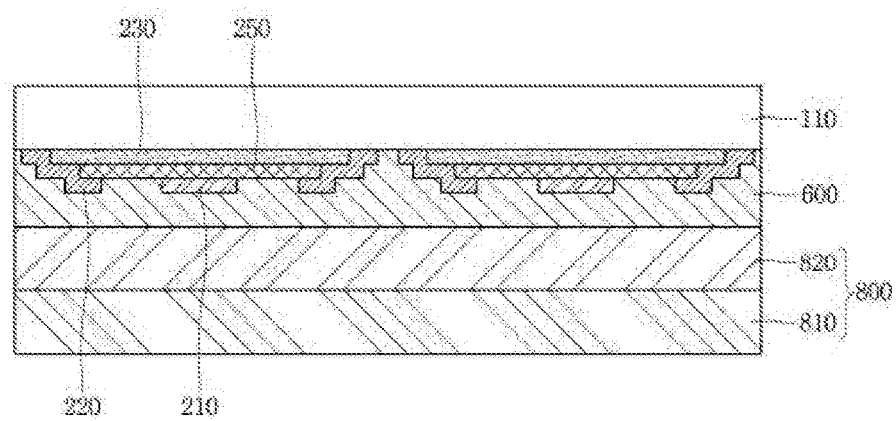
FIGS. 26 to 29 are sectional views showing a touch window and a display panel which are coupled to each other according to an embodiment.

First, referring to FIG. 26, a touch device according to an embodiment may include a touch window disposed on a display panel 600.

The touch device may be formed by coupling the cover substrate 110 to the display panel 800. The cover substrate 110 may adhere to the display panel 800 through an adhesive layer 600. For example, the cover substrate 110 and the display panel 800 may be combined with each other through optical transparent adhesive (OCA).

In addition, the first electrode 210 may extend in the first direction on the active area AA of the cover substrate 110. The first electrode 210 may make direct contact with the cover substrate 110. In addition, the second electrode 220 may extend in the second direction on the active area AA of the cover substrate 110. In detail, the second sensing electrode 220 may make direct contact with the cover substrate 110 while extending in the second direction different from the first direction. That is, the first and second electrodes 210 and 220 may make direct contact with the same surface of the cover substrate 110 and may be disposed on the same surface of the cover substrate 110 while extending in the same direction.

The first and second electrode 210 and 220 are insulated from each other on the cover substrate 110.

A bridge electrode 230 may be disposed on one surface of the cover substrate 110 on which the sensing electrode is disposed. The bridge electrode 230 may be provided, for example, in a bar shape. In detail, the bridge electrodes 230 may be spaced apart from each other by a predetermined interval while being provided in the bar shape.

An insulating material 250 may be provided on the bridge electrode 230. In detail, the insulating material 250 may be partially disposed on the bridge electrode 230 and the part of the bridge electrode 230 may be covered with the insulating material 250. For example, when the bridge electrode is provided in a bar shape, the insulating material 250 may be disposed on the area except for one end and the opposite end, that is, both end portions of the bridge electrode 230.

The first electrodes 210 may be connected to each other and extend on the insulating material 250. For example, the first electrodes 210 extending in the first direction are connected to each other on the insulating material 250.

In addition, the second electrode 220 may be connected to the bridge electrode 230. In detail, the second electrodes 220, which are spaced apart from each other, may be connected to the bridge electrode 230 while extending in the second direction.

Thus, the first and second electrodes 210 and 220 may be electrically connected to each other without being short-circuited with each other due to the insulating material, respectively.

If the display panel 800 is a liquid crystal display panel, the display panel 800 may have a structure in which the first substrate 810 including a thin film transistor (TFT) and a pixel electrode is combined with the second substrate 820 including color filter layers while a liquid crystal layer is interposed between the first and second substrates 810 and 820.

Further, the display panel 800 may be a liquid crystal display panel having a color filter on transistor (COT) structure formed by combining the first substrate 810 formed thereon with the TFT, a color filter, and a black matrix with the second substrate 820 while the liquid crystal layer is interposed between the first and second substrates 810 and 820. In other words, the TFT may be formed on the first substrate 810, a protective layer may be formed on the TFT, and the color filter layer may be formed on the protective layer. In addition, the pixel electrode, which makes contact with the TFT, is formed on the first substrate 810. In this case, to improve an aperture ratio and simplify a mask process, the black matrix may be omitted, and a common electrode may perform a function of the black matrix together with the inherent function thereof In addition, when the display panel 820 is a liquid crystal panel, the display device may further include a backlight unit for supplying light onto a rear surface of the display panel 820.

When the display panel 820 is an organic light emitting device, the display panel 800 includes a self-light-emitting device which does not require any additional light source. A thin film transistor is formed on the first substrate 810 of the display panel 800, and an organic light-emitting device (OLED) making contact with the thin film transistor is formed. The OLED may include an anode, a cathode and an organic light-emitting layer formed between the anode and the cathode. In addition, the display panel 800 may further include the second substrate 820, which performs the function of an encapsulation substrate for encapsulation, on the OLED.

Figure 27:
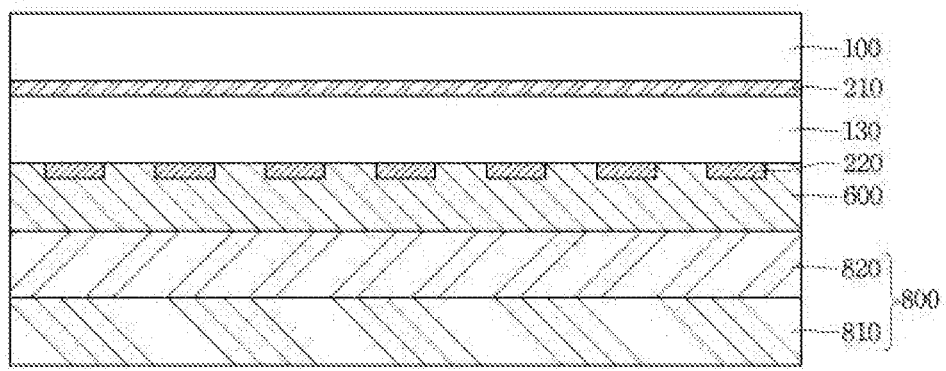

Referring to FIG. 27, when the substrate 130 is further disposed on the cover substrate 100, the touch device may be formed by coupling the substrate 130 to the display panel 800. The substrate 130 may adhere to the display panel 800 through the adhesive layer 600. For example, the substrate 130 and the display panel 800 may be combined with each other through the adhesive layer 600 having optical transparent adhesive (OCA).

Figure 28:
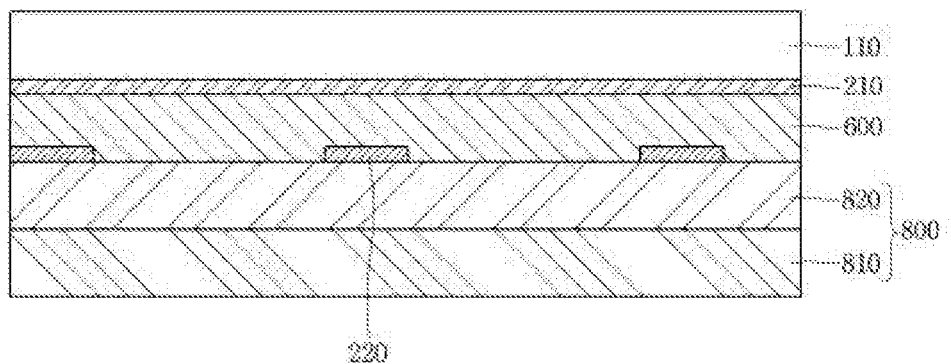

Referring to FIG. 28, a touch device according to an embodiment may include a touch panel which is formed integrally with a display panel 800. That is, the substrate 130 supporting at least one sensing electrode may be omitted.

In detail, at least one sensing electrode may be formed on at least one surface of the display panel 800. That is, at least one sensing electrode may be formed on at least one of the first and second substrates 810 and 820. In this case, at least one sensing electrode may be formed on the substrate disposed at an upper portion.

In detail, the first electrode 210 may be disposed on one surface of the cover substrate 110. In addition, the first wire connected to the first electrode 210 may be disposed. In addition, the second electrode 220 may be disposed on one surface of the display panel 800. In addition, the second wire connected to the second electrode 220 may be disposed.

The adhesive layer 600 may be interposed between the cover substrate 110 and the display panel 800 so that the cover substrate 110 and the display panel 800 are combined with each other.

In addition, a polarizing plate disposed at a low portion of the cover substrate 110 may be further included. The polarizing plate may be a linear polarizing plate or an anti-reflection polarizing plate. For example, when the display panel 800 is a liquid crystal display panel, the polarizing plate may be a linear polarizing plate. In addition, when the display panel 800 is an organic electroluminescent display panel, the polarizing plate may be an anti-reflection polarizing plate. In this case, at least one electrode may be disposed on one surface of the polarizing plate.

A touch device according to an embodiment may allow at least one substrate supporting an electrode to be omitted. For this reason, a touch device having a thin thickness and a light weight may be formed.

Figure 29:
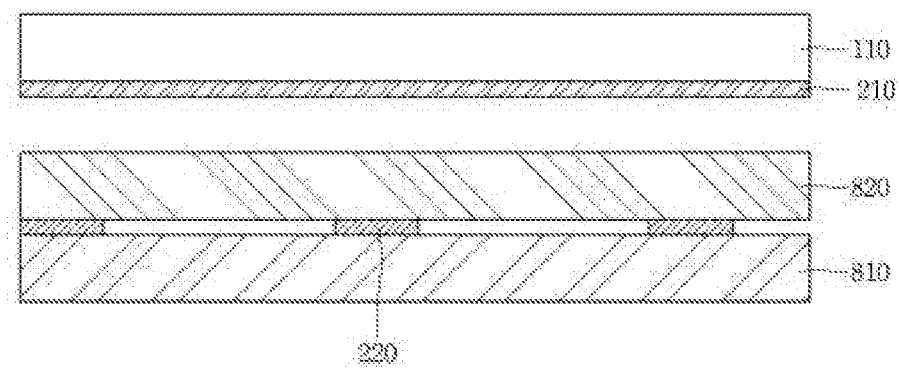

Referring to FIG. 29, a touch device according to an embodiment may include a touch panel integrated with a display panel 800. That is, a substrate for supporting at least one sensing electrode may be omitted.

For example, a sensing electrode, which serves as a sensor disposed in an active area to sense a touch, and a wire, to which an electrical signal is applied, may be formed inside the display panel. In detail, at least one sensing electrode or at least one wire may be formed inside the display panel.

The display panel includes the first and second substrates 810 and 820. In this case, at least one of the first and second sensing electrodes 210 and 220 is disposed between the first and second substrates 810 and 820. That is, at least one electrode may be disposed on at least one surface of the first or second substrate 810 or 820.

In detail, the first electrode 210 may be disposed on one surface of the cover substrate 110. In addition, the first wire connected to the first electrode 210 may be disposed. The second electrode 220 and the second wire may be formed between the first and second substrates 810 and 820. That is, the second electrode 220 and the second wire may be disposed at an inside of the display panel, and the first electrode 210 and the first wire may be disposed at an outside of the display panel.

The second electrode 220 and the second wire may be disposed on the top surface of the first substrate 810 or the bottom surface of the second substrate 820.

In addition, a polarizing plate may be further provided under the substrate. In this case, at least one sensing electrode may be disposed on one surface of the polarizing plate.

A touch device according to an embodiment may allow at least one substrate supporting a touch device to be omitted. For this reason, the touch device having a thin thickness and a light weight may be formed. In addition, the sensing electrode and the wire are formed with a device formed on the display panel, so that the process may be simplified and the cost may be reduced.

Figure 30:
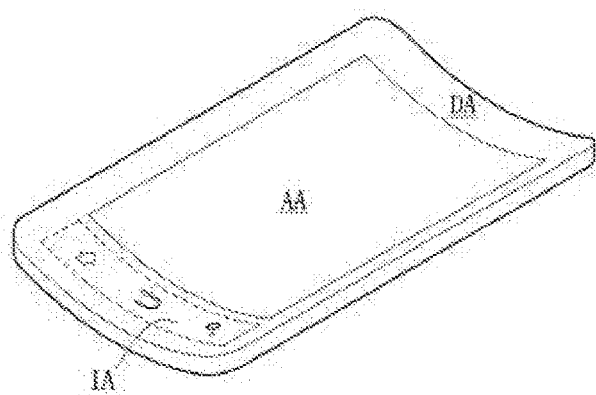
FIGS. 30 to 33 are perspective views showing a touch device according to an embodiment.

As shown in FIG. 30, the touch device may include a mobile terminal.

Specifically, the touch window may include a curved touch window. That is, the touch window may be fixed while having a curvature. Specifically, when the touch window is applied to a vehicle, the curved touch window may be applied. Thus, a touch device including the curved touch window may be a curved touch device.

Figure 31:
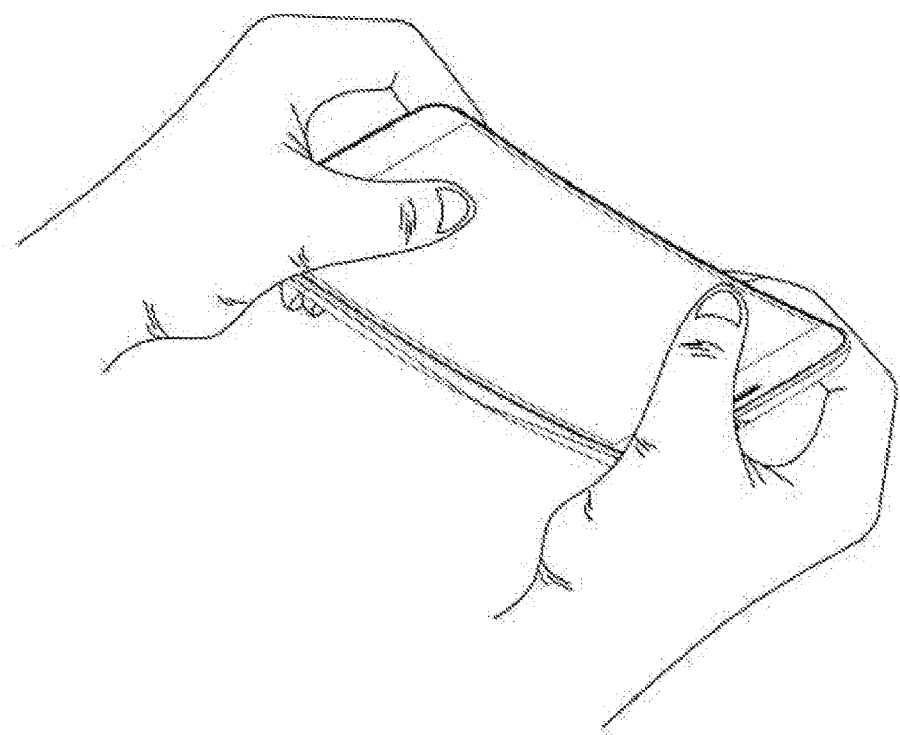

Referring to FIG. 31, the touch window may include a flexible touch window that is capable of being bent. Accordingly, the touch display including the flexible touch window may be a flexible touch display. Thus, a user may bend or curve the flexible touch window with the hand of the user.

Figure 32:
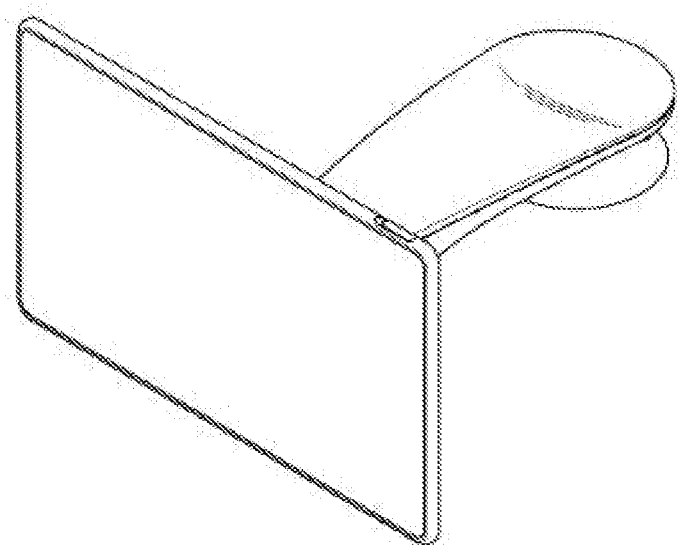

Referring to FIG. 32, the touch window may be applied to a vehicle navigation system as well as a touch device such as a mobile terminal.

Figure 33:
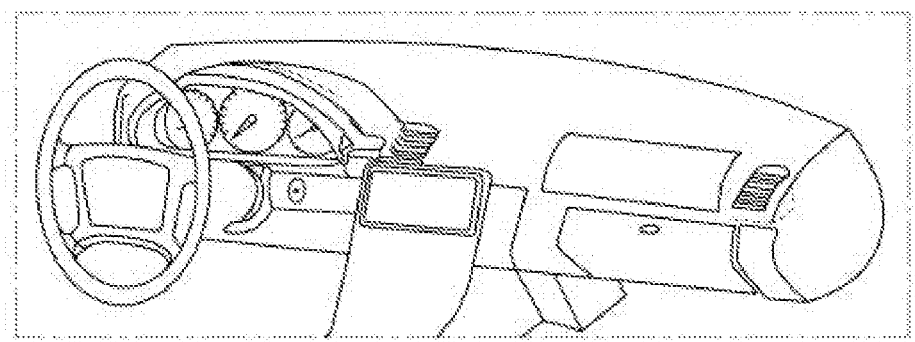

In addition, referring to FIG. 33, the touch window may be applied to an inner part of a vehicle. In other words, the touch window may be applied to various parts in the vehicle. Accordingly, the touch window may be applied to a dashboard 100 as well as a PND (Personal Navigation Display), so that a CID (Center Information Display) may be realized. However, the embodiment is not limited to the above, and such a touch device may be used for various electronic appliances.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

According to the embodiment, the touch window may prevent a signal from being distorted, so that the accuracy of a touch may be improved.

What is claimed is:

1. A touch window comprising:
an electrode member;
a cover substrate comprising an active area and an inactive area on the electrode member;
a sensing electrode on the electrode member;
a wire on the electrode member and electrically connected to the sensing electrode; and
a connection part connected to one end of the wire and connected to a circuit board,
wherein the sensing electrode includes a first sensing electrode extending in a first direction and a second sensing electrode extending in a second direction different from the first direction,
wherein the wire includes a first wire connected to the first sensing electrode and a second wire connected to the second sensing electrode, and wherein the first sensing electrode, the second sensing electrode, the first wire, and the second wire are disposed on a same surface of the electrode member,
wherein the wire comprises a plurality of wires, and
wherein the wire has a line width that varies according to a distance from the connection part.

2. The touch window of claim 1, wherein an amount of charges in a sectional area of the wire is varied depending on a position in the wire.

3. The touch window of claim 1, wherein an amount of charges in a sectional area of the wire is gradually increased as the wire is away from the connection part.

4. The touch window of claim 1, wherein the line width of the wire is gradually increased as the wire is away from the connection part.

5. The touch window of claim 1, wherein a width of the wire is proportional to a distance between the sensing electrode and connection part connected to each of the wire.

6. The touch window of claim 1, wherein the wires have mutually different lengths.

7. The touch window of claim 1, wherein the cover substrate has a partial flat surface and a partial curved surface.

8. The touch window of claim 1, wherein an end portion of the cover substrate has a curved surface.

9. The touch window of claim 1, wherein an end portion of the cover substrate is bent from a partial flat surface of the cover substrate.

10. The touch window of claim 1, wherein the wire has a bent region in which the direction is changed,
wherein a line width of the wire changes from the bent region.

11. The touch window of claim 10, wherein the wire includes a first wire line extending from one end of the bent region and a second wire line extending from the other end of the bent region,
wherein a line width of the first wire line extending from one end of the bent region and a line width of the second wire line extending from the other end of the bent region are different from each other.

12. A touch device comprising;
a first substrate;
a thin film transistor on the first substrate;
an encapsulation substrate on the thin film transistor;
a cover substrate comprising an active area and an inactive area on the encapsulation substrate;
a sensing electrode on the encapsulation substrate;
a wire on the encapsulation substrate and electrically connected to the sensing electrode; and
a connection part connected to one end of the wire and connected to a circuit board,
wherein the sensing electrode includes a first sensing electrode extending in a first direction and a second sensing electrode extending in a second direction different from the first direction,
wherein the wire includes a first wire connected to the first sensing electrode and a second wire connected to the second sensing electrode, and wherein the first sensing electrode, the second sensing electrode, the first wire, and the second wire are disposed on a same surface of the encapsulation substrate,
wherein the wire comprises a plurality of wires, and
wherein the wire has a line width that varies according to a distance from the connection part.

13. The touch device of claim 12, wherein an amount of charges in a sectional area of the wire is varied depending on a position in the wire.

14. The touch device of claim 12, wherein an amount of charges in a sectional area of the wire is gradually increased as the wire is away from the connection part.

15. The touch device of claim 12, wherein the line width of the wire is gradually increased as the wire is away from the connection part.

16. The touch device of claim 12, wherein a width of the wire is proportional to a distance between the sensing electrode and connection part connected to each of the wire.

17. The touch device of claim 12, wherein the wires have mutually different lengths.

18. The touch device of claim 12, wherein the cover substrate has a partial flat surface and a partial curved surface.

19. The touch device of claim 12, wherein an end portion of the cover substrate has a curved surface.

20. The touch device of claim 12, wherein an end portion of the cover substrate is bent from a partial flat surface of the cover substrate.

* * * * *